(12) United States Patent
Coene

(10) Patent No.: US 9,225,645 B2
(45) Date of Patent: Dec. 29, 2015

(54) METHOD FOR TRANSMITTING PACKETS IN A NETWORK

(75) Inventor: Lode Coene, Brugge Sintkruis (BE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1398 days.

(21) Appl. No.: 12/309,221

(22) PCT Filed: Mar. 16, 2007

(86) PCT No.: PCT/EP2007/052527
§ 371 (c)(1),
(2), (4) Date: Jan. 12, 2009

(87) PCT Pub. No.: WO2008/006629
PCT Pub. Date: Jan. 17, 2008

(65) Prior Publication Data
US 2009/0245244 A1    Oct. 1, 2009

(30) Foreign Application Priority Data

Jul. 12, 2006  (EP) .................................. 06014496

(51) Int. Cl.
*H04L 12/801*    (2013.01)
*H04L 12/721*    (2013.01)
*H04L 12/805*    (2013.01)

(52) U.S. Cl.
CPC ............... *H04L 47/10* (2013.01); *H04L 45/26* (2013.01); *H04L 47/19* (2013.01); *H04L 47/36* (2013.01)

(58) Field of Classification Search
CPC ............ H04L 29/0653; H04L 29/0654; H04L 1/0028; H04L 1/0029; H04L 1/003; H04L 1/0031; H04L 1/0032

USPC ......... 370/335, 342, 473, 474, 476, 477, 478, 370/479, 480, 511, 514
See application file for complete search history.

(56) References Cited

U.S. PATENT DOCUMENTS 6,564,267 B1 *  5/2003  Lindsay ....................... 709/250
7,355,971 B2 *  4/2008  Jason, Jr. ..................... 370/231

(Continued)

FOREIGN PATENT DOCUMENTS

CN          1710880 A      12/2005

OTHER PUBLICATIONS

J. McCann et al: "Path MTU Discovery for IP Version 6; rfc 1981.txt" IETF Standard, Internet Engineering Task Force, IETF, CH, Aug. 1996, XP015007765.

(Continued)

*Primary Examiner* — Dady Chery
(74) *Attorney, Agent, or Firm* — Staas & Halsey LLP

(57) ABSTRACT

Stream Control Transmission Protocol (SCTP) transmits packets to the remote peer with a size equal or smaller than Maximum Transmission Unit (MTU). The MTU can be discovered by SCTP utilizing the path-MTU discovery algorithm of RFC1191 (or similar techniques). However the MTU of a certain path within a SCTP association can change over time. If the path MTU grows then there is no problem. If the path MTU decreases, then packets with size equal to the old path MTU will not be able to be delivered to the remote peer as the link or router with the smaller MTU will drop the packet. Thus all such packets will remain unacknowledged and will lead to head of line blocking for in-sequence delivery of packets of the streams to which to non-delivered packets belong. This leads to the failure of the association. The proposed method resegments SCTP-packets due to a path MTU decrease in a SCTP association.

6 Claims, 1 Drawing Sheet

(56) References Cited

U.S. PATENT DOCUMENTS

2005/0281288 A1    12/2005  Banerjee et al.
2007/0171828 A1*   7/2007   Dalal et al. .................... 370/235

OTHER PUBLICATIONS

R. Stewart et al: "Stream Control Transmission Protocol (SCTP) Partial Reliability Extension", Request for Comments: 3758 (Online) May 2004, pp. 1-22, XP002399823.

R. Stewart et al: "Stream Control Transmission Protocol; draft-ieff-tsvwg-rfc2960-bis-oo.txt", IETF Standard-Working-Draft, Internet Engineering Task Force, IETF, CH, vol. tsvwg, May 16, 2001, XP015029382.

International Search Report issued on May 21, 2007 in corresponding International Patent Application PCT/EP2007/052527.

Chinese Office Action issued Apr. 1, 2014 in corresponding Chinese Patent Application No. 200780022101.7.

* cited by examiner

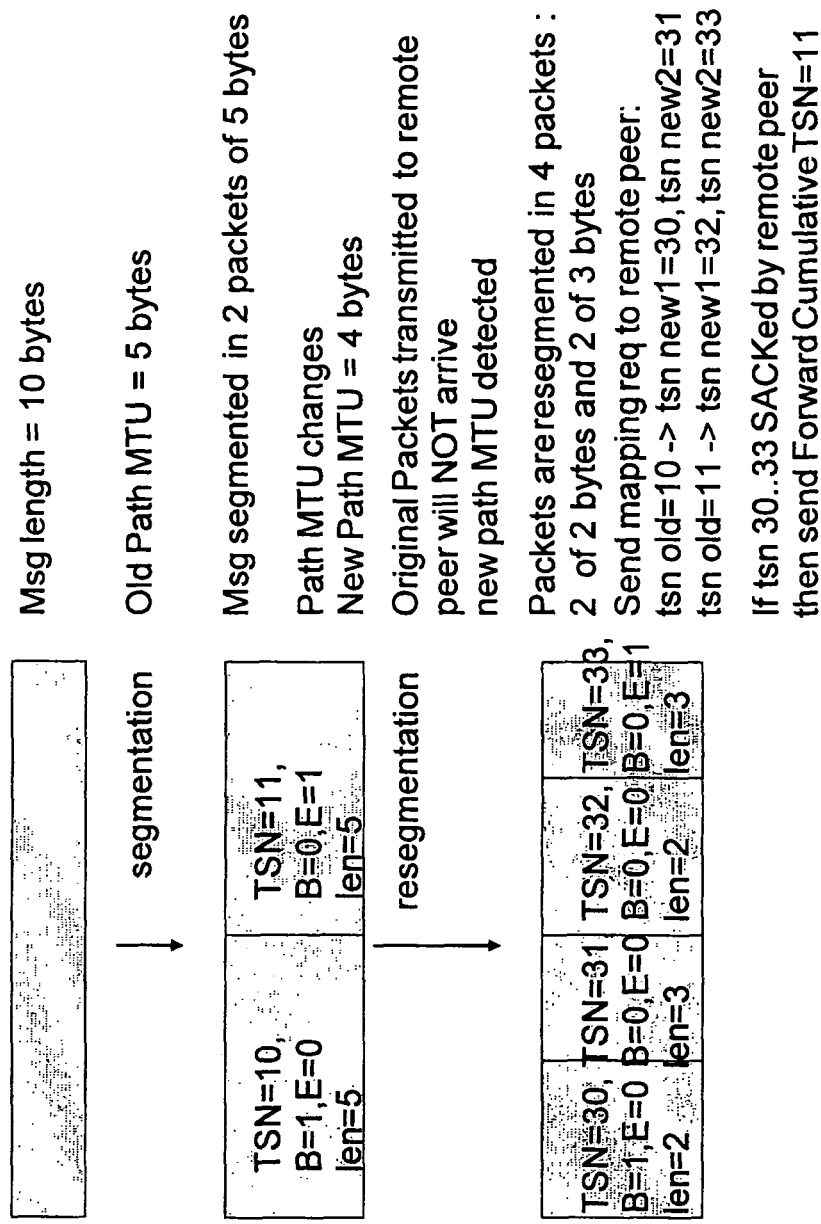

METHOD FOR TRANSMITTING PACKETS IN A NETWORK

CROSS REFERENCE TO RELATED APPLICATIONS

This application is based on and hereby claims priority to European Application No. EP06014496 filed on Jul. 12, 2006 and International PCT Application No. PCT/EP2007/052567 filed on Mar. 16, 2007, the contents of which are hereby incorporated by reference.

BACKGROUND OF THE INVENTION

A Transmission Protocol like Stream Control Transmission Protocol (=SCTP) transmits packets to the remote peer with a size equal or smaller than a Maximum Transmission Unit (=MTU). In case of SCTP the MTU of a path can be discovered utilising the path-MTU discovery algorithm of RFC1191 (or similar techniques). However the MTU of a certain path within a SCTP association can change over time. If the path-MTU (MTU of a certain path) grows during a SCTP association then there is no problem. If the path MTU decreases, then packets with size equal to the old path MTU will not be able to be delivered to the remote peer as the link or router with the smaller MTU will drop the packet. Thus all such packets will remain unacknowledged and will lead to head of line blocking for in-sequence delivery of packets of the streams to which to non-delivered packets belong. This leads to the failure of the association.

The problem has not been solved in SCTP up till now.

SUMMARY

The inventor proposes a transmission protocol that resegments packets of a connection (in case of SCTP a connection is called an association) due to a discovered decrease of the maximum packet size (MTU) with sizes to match the new maximum packet size (MTU).

In the following an SCTP implementation of the invention is described for all modes of operations for delivering of messages/packets to an application (see also the FIGUR of the Drawing).

BRIEF DESCRIPTION OF THE DRAWING

These and other objects and advantages of the present invention will become more apparent and more readily appreciated from the following description of the preferred embodiments, taken in conjunction with the accompanying FIGURE which schematically represents segmenting and resegmenting a message.

DETAILED DESCRIPTION OF THE PREFERRED EMBODIMENT

Reference will now be made in detail to the preferred embodiments of the present invention, examples of which are illustrated in the accompanying drawing.

According to SCTP each message can be segmented in one or more packets and each packet has a transmission sequence number (=TSN) assigned to it. Each packet also is assigned to a certain stream via the stream identifier (stream id). All messages in sequenced operation belonging to the same stream id must be delivered to the peer application in order. The SCTP implementation should be doing path-MTU discovery for each of its paths on a regular basis (this is required by RFC2932). When the reduction of the path MTU has been detected, then the following actions for either unordered or ordered delivery should be observed. The detection can be done via RFC1191 or similar techniques (RFC1981, draft-ietf-pmtud-method-06.txt . . . ).

First the new path MTU must be detected via the use of path MTU discovery. If the path MTU was reduced, the old packet must be resegmented with sizes to match the new path MTU (so at least 2 new TSN must be allocated in sequence)

If only a single packet was generated for the message, then the required resegmentation may yield 2 or more packets. The packets need to be segmented according to the rules found in RFC2932.

If the original packet was already the result of segmenting the message, then the old packet must be segmented again with new TSN's in sequence for each old TSN packet according to the rules found in RFC2932.

In addition, a resegment parameter contained in a control packet (SCTP control chunk), is sent towards to the remote peer to indicate what old TSN is replaced by the new TSN's. The old TSN will be mapped to 2 or more new TSN's and packets already received before and after the old TSN must be used if required to reassemble the complete message. The resegment parameter may be contained in any of the already existing SCTP control chunks or a new SCTP remapping control chunk.

The resegment parameter must be sent to the remote peer before the new resegmented packets are sent to the remote peer.

The resegment parameter contains an old TSN and a list of one or more new TSN's. This maps the old TSN to the new TSN's. The resegement parameter may contain a list of mappings or could be repeated within or across control chunks.

The old packet TSN is invalidated by sending to the remote peer the forward cumulative TSN chunk with the TSN set to the old packet TSN. See specific use of the Forward cumulative TSN in RFC3758. This can only be done after the message has been successfully reassembled from packets using the outstanding old TSN and mapped old-to-new TSN's.

The packets with the old TSN must not be resent to the remote peer after sending the resegment parameter.

After receiving the resegment parameter, the remote peer is not required to issue gap reports for the old TSN's.(Gap report=request for the sender peer to send the packets again, in this case the old TSN)

When the remote peer has received all the new TSN segments and reassembled the message, then the message must be delivered to the application. The delivered message is followed by the messages containing the original old TSN in case of ordered delivery. In case of unordered delivery, the messages with the original old TSN were already delivered to the application.

The number of packets sent after resegmenting must not violate the rules on outstanding packets due to the congestion algorithm utilized in SCTP RFC2932 and others.

Allows SCTP not to block transmission of data to the remote peer if the path MTU is reduced during transmission. TCP does not have this problem due to the use of byte counting as the TSN (TCP simply divides up the message and uses a byte count TSN in between followed by the original byte count TSN). The proposed method solves a weakness of SCTP in comparison to TCP and allows SCTP to be more acceptable to TCP applications (especially in case of very long lived time connections/associations) especially in single homed associations. If multi-homed associations are used, the too-large message has the possibility to be transmitted via the alternate paths(assuming the path MTU has not changed along those paths).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for transmitting packets in a network, comprising:
    transmitting packets of a message of a connection, the packets being segmented from a data stream to have a packet size equal to or smaller than a maximum packet size;
    assigning each packet of a transmission sequence number;
    transmitting the segmented packets to a remote peer of the connection;
    continuously monitoring a current maximum packet size;
    resegmenting the packets with new transmission sequence numbers when a decrease in the maximum packet size has been monitored, the packets being resegemented to have packet sizes that match the current maximum packet size;
    sending a resegment parameter to the remote peer to indicate which previously received transmission sequence numbers are being replaced with a new transmission sequence number; and
    transmitting the resegmented packets to the remote user after sending the resegment parameter.

2. The method of claim 1, wherein
    packets are transmitted on a plurality of paths, and
    the current maximum packet size is discovered for each path.

3. The method according claim 2, comprising further:
    not transmitting packets having a packet size larger than the maximum packet size.

4. The method according claim 2, the wherein:
    packets are transmitted according to a Stream Control Transmission Protocol (SCTP).

5. The method according claim 1, comprising further:
    not transmitting packets having a packet size larger than the maximum packet size.

6. The method according claim 1, wherein:
    packets are transmitted according to a Stream Control Transmission Protocol (SCTP).

* * * * *

UNITED STATES PATENT AND TRADEMARK OFFICE
CERTIFICATE OF CORRECTION

| | | |
|---|---|---|
| PATENT NO. | : 9,225,645 B2 | Page 1 of 1 |
| APPLICATION NO. | : 12/309221 | |
| DATED | : December 29, 2015 | |
| INVENTOR(S) | : Lode Coene | |

It is certified that error appears in the above-identified patent and that said Letters Patent is hereby corrected as shown below:

In the Specification

Column 1, Line 9
Delete "PCT/EP2007/052567" and insert -- PCT/EP2007/052527 --, therefor.

In the Claims

Column 4, Line 1, Claim 1
Delete "resegemented" and insert -- resegmented --, therefor.

Column 4, Line 14, Claim 3
After "according" insert -- to --.

Column 4, Line 17, Claim 4
After "according" insert -- to --.

Column 4, Line 17, Claim 4
Before "wherein:" delete "the".

Column 4, Line 20, Claim 5
After "according" insert -- to --.

Column 4, Line 23, Claim 6
After "according" insert -- to --.

Signed and Sealed this
Twenty-sixth Day of April, 2016

Michelle K. Lee
*Director of the United States Patent and Trademark Office*